United States Patent [19]

Marantz et al.

[11] 3,850,835

[45] Nov. 26, 1974

[54] METHOD OF MAKING GRANULAR ZIRCONIUM HYDROUS OXIDE ION EXCHANGERS, SUCH AS ZIRCONIUM PHOSPHATE AND HYDROUS ZIRCONIUM OXIDE, PARTICULARLY FOR COLUMN USE

[75] Inventors: Laurence B. Marantz, Sherman Oaks; Clifford M. Moran, San Gabriel, both of Calif.

[73] Assignee: CCI Life Systems, Van Nuys, Calif.

[22] Filed: Nov. 8, 1971

[21] Appl. No.: 196,805

[52] U.S. Cl.............. 252/182, 210/24, 210/263, 252/179, 252/313 R, 423/70, 423/84, 423/85, 423/181
[51] Int. Cl................. C02b 1/44, C01g 25/02
[58] Field of Search............. 252/182, 179, 313 R; 423/70, 80, 84, 85, 181; 210/24, 263

[56] References Cited

UNITED STATES PATENTS

| | | | |
|---|---|---|---|
| 2,970,035 | 1/1961 | Stoughton | 210/24 |
| 3,332,737 | 7/1967 | Kraus | 423/181 |
| 3,416,884 | 12/1968 | Stynes et al. | 423/181 |
| 3,522,187 | 7/1970 | Kraus | 252/179 |
| 3,551,095 | 12/1970 | Blumenthal | 423/84 |

Primary Examiner—Stephen J. Lechert, Jr.
Assistant Examiner—Irwin Gluck
Attorney, Agent, or Firm—Lyon & Lyon

[57] ABSTRACT

A method of producing zirconium hydrous oxide ion exchangers by adding zirconium compound in granular form to a reagent which fixes the shape of the initial zirconium compound particles by converting the zirconium compound to insoluble zirconium hydrous oxide ion exchangers.

13 Claims, No Drawings

METHOD OF MAKING GRANULAR ZIRCONIUM HYDROUS OXIDE ION EXCHANGERS, SUCH AS ZIRCONIUM PHOSPHATE AND HYDROUS ZIRCONIUM OXIDE, PARTICULARLY FOR COLUMN USE

BACKGROUND OF THE INVENTION

The use of hydrous oxide ion exchangers for separating inorganic ions from an aqueous solution has been investigated and results are reported in U.S. Pat. No. 3,332,737 issued to Kurt A. Kraus. In the terminology of this patent, a zirconium hydrous oxide ion exchanger is defined as amorphous or microcrystalline solids containing zirconium or zirconium plus other oxides or hydroxides and varying amounts of water, with exchangeable ions depending on the substances and their treatment. Although such material may be described by a particular formula or name, it should be understood that these materials have no simple or definite stoichiometric composition and may not have any crystal structure when examined by X-ray defraction.

Zirconium phosphate ion exchangers have been prepared by mixing together a solution of zirconium compound and a solution of a phosphate. The resulting precipitate material is either a very fine powder or a gelatinous insoluble material suspended in an aqueous solution. These products are very difficult to filter to remove water and require a substantial amount of equipment to accomplish the filtration of a very small amount of zirconium phosphate. When a gelatinous material results, the material after filtration is dried and results in a very fine powder.

When fine zirconium phosphate is produced by reacting an aqueous solution of a zirconium salt with an aqueous solution of a phosphate, the resulting product may be a mixed phosphate of non-stoichiometric composition, containing cations from the soluble phosphate. Aqueous solutions are used because homogeneous reactions tend to go to completion and are more rapid. The fine powder resulting after filtering and drying is too fine to be utilized in an ion exchanger column since the resistance to flow through the column is too great.

Larger crystalline zirconium phosphate can be produced as set forth in U.S. Pat. No. 3,416,884, granted to Stynes and Clearfield. The solutions are boiled for several days and microscopic or noncrystalline substances are converted slowly into macroscopic crystalline zirconium phosphate. However, the time involved in the heating process makes this product expensive. Because of the difficulties in producing granular zirconium phosphate with present methods, the product has not been used extensively.

Hydrous zirconium oxide ion exchangers can be produced by the same processes and the resulting product is also a very finely powdered material which is suitable for use in poison ivy ointment, dermatitis cream and anti-perspirants. However, the resulting fine powder cannot be utilized in an ion exchange column since it is difficult for water to pass through the fine powder, and a high pressure drop results across the column. Because of the granular size required for column use, present methods of manufacturing zirconium hydrous oxide ion exchanger are not commercially feasible.

SUMMARY OF THE PRESENT INVENTION

The present invention relates to methods of producing zirconium hydrous oxide ion exchangers in any desired mesh size range. The method is particularly useful for making a granular product in a mesh size range suitable for use in ion exchange columns for liquids from which inorganic ions are to be separated. Present requirements for such ion exchangers exist in the treatment of dialysis solution for artificial kidney systems to remove the ammonia resulting from the conversion of urea by urease. Such a treatment is disclosed in co-pending U.S. Pat. application Ser. No. 837,714, filed June 30, 1969, and assigned to the same assignee. In this system, the ammonium ion resulting from the conversion of urea is removed by a zirconium phosphate ion exchanger in a column and the phosphate in the dialysis solution returning from the artificial kidney is removed by a hydrous zirconium oxide ion exchanger. The dialysis treatment provides a recirculating flow process in which the dialysis fluid returning from the kidney is continuously passed through a column or columns containing granular zirconium phosphate and hydrous zirconium oxide.

It has been determined that zirconium phosphate and hydrous zirconium oxide particles in the 12 to 325 mesh distribution band may be used in the column providing there is not a substantially large amount of 325 mesh particles nor an excessive large amount of 12 mesh particles. The finer mesh material inhibits the flow of liquid and tends to pack in the column, even though the liquid makes good contact with the material. On the other hand, the large particles permit easy flow through the column but do not allow enough surface area of zirconium compound to be exposed to the liquid in order to pick up the ions.

The present invention provides a commercially feasible method of producing zirconium hydrous oxide ion exchangers, such as zirconium phosphate and zirconium oxide, in the proper mesh range for column use. Generally the process consists of adding, in solid form, particles of a soluble or semi-soluble zirconium compound to a reagent solution. The initial mesh of the zirconium compound particles determines the mesh distribution band of the final ion exchanger particles. In order to produce zirconium phosphate, zirconium compound in particle form is added to a phosphate solution and in order to produce hydrous zirconium oxide, a zirconium compound in particle form is added to a basic solution such as sodium hydroxide. The zirconium particles are fixed in shape by the reagent and are converted into ion exchanger particles without dissolving in the insolublizing reagent.

Thus, the present invention provides a low-cost, commercially feasible process for preparing zirconium hydrous oxide ion exchanger, such as zirconium phosphate and hydrous zirconium oxide, in granular form suitable for use in ion exchanger type columns. The resulting granular product forms rapidly so that long expensive filtration is not required and the product lends itself to high production quantities. All references to particle mesh size herein is to Tyler standard screen scale sieve size and reference to zirconium phosphate and hydrous zirconium oxide is to an ion exchanger form. It is understood that the method is also applicable to the production of larger particles, which can be later crushed to a suitable size, if desired, and to the production of very fine particles which are useful in other applications since the final particle size varies with the initial size of the zirconium compound particles.

DETAILED DESCRIPTION OF THE INVENTION

In the production of zirconium phosphate particles, a zirconium compound in particle form having a desired mesh distribution band is added to an aqueous solution of a phosphate. The zirconium compound must be a soluble or semi-soluble compound, such as zirconium oxychloride, zirconium nitrate, zirconium sulfate, zirconium acetate, or basic zirconium sulfate and the phosphate solution can consist of phosphoric acid, sodium phosphate or a mixed sodium hydrogen phosphate solution. The solution concentration of phosphate is preferably on the order of 2.5 molar and the temperature of the reaction can be anywhere from room temperature to 100° C. for adequate product production. The solution with the zirconium compound particles added is stirred for a period from five to thirty minutes to insure that the phosphate penetrates into the inside of the zirconium compound particles, thereby converting all of the zirconium compound into an insoluble zirconium phosphate. The solution is then filtered free of the reaction mixture and is then washed with water until all soluble phosphate is removed. Thereafter, to insure that there is sufficient phosphate penetration under given production conditions, the granules can be tested to determine if there is free zirconium compound left in the granules. Sufficient time should be allowed for the phosphate to get into the solid zirconium compound so that the resulting product is substantially all insoluble zirconium phosphate. With most phosphate materials, the initial molar concentration of the phosphate in the aqueous solution can go to the solubility limit. However, in the case of phosphoric acid, initial molar concentration higher than 2.5 molar results in an undesirable gelled product. Also concentrations of phosphate below 0.5 molar at any point in the process results in the formation of friable granular material that breaks down into a fine powder too easily. The zirconium compound must be slightly more soluble than the resulting zirconium phosphate product. A zirconium compound that is insoluble will not produce a desired product since it does not allow the phosphate to penetrate to the interior portion of the compound. However, the zirconium compound particles do not dissolve while converting to zirconium phosphate. The phosphate acts as an insolubilizing reagent since it changes the zirconium into insoluble zirconium phosphate and thereby fixes the shape of the granules.

The final particle size of the zirconium phosphate is controlled by the initial particle size of the zirconium compound, and if, for example, a 1 millimeter piece of zirconium oxychloride is used as the starting compound, the final particles of zirconium phosphate will be slightly larger than 1 millimeter. In general, the final particle size increases slightly but there is some introduction of finer particles because of the processing of the particles. It has been determined that starting particles greater than 12 mesh results in granules that are very weak physically and can be crushed easily on subsequent operations. Also, it has been determined that starting particles smaller than 325 mesh produce resulting particles which are too fine for filtration if present in any substantial amount. Generally speaking, size should be in the 12 to 325 mesh distribution band with the majority of the particles being of intermediate size.

The general reaction for the conversion of zirconium compound into zirconium phosphate is as follows:

Zirconium X + N phosphate = zirconium phosphate + NX Where X is an anion of soluble or semi-soluble zirconium compound and N is a cation of soluble phosphate The phosphate must be highly soluble phosphate since a semi-soluble compound such as calcium phosphate will not work. Since the phosphate concentration in the solution should not drop below 0.5 molar during the reaction, the phosphate compound must be soluble to greater than 0.5 molar. The mechanism of reaction is that the phosphate in the soluble phosphate solution is exchanged for the anion in the soluble zirconium compound. The zirconium phosphate, being insoluble, fixes the zirconium in the configuration found when the phosphate contacts it.

A preferred reaction for the production of zirconium phosphate is the reaction of zirconium oxychloride with phosphoric acid as exemplified by the followikng reaction:

$$ZrOCl_2 \cdot XH_2O + 2\ H_3PO_4 \longrightarrow Zr(HPO_4)_2 \cdot H_2O + 2\ HCl + XH_2O$$

Where X is normally 0 to 8

The form of the final zirconium phosphate product is a mixed compound in which the zirconium phosphate is only a part of the product. The product has no known fixed chemical formula. As illustrated by the above reaction, the chloride is exchanged by phosphate.

Typical examples of the preparation of zirconium phosphate are the following:

EXAMPLE I 49.5 grams zirconium oxychloride screened 28–48 mesh was slowly added to a stirred solution of 100 ml concentrated phosphoric acid dissolved in 900 ml of water. The granular product was filtered, washed, and air-dried. Initial molar concentration of phosphate was 1.4 and final mesh was 20 – 80.

EXAMPLE II 30 grams basic zirconium sulfate 200–325 mesh was slowly added to a stirred 20 ml concentrated phosphoric acid dissolved in 180 ml of water. The product was filtered, washed, and air-dried. Initial molar concentration of phosphate was 1.4 and final mesh was 150 – 325.

EXAMPLE III 17.7 grams zirconium oxychloride screened 20–150 mesh was slowly added to a stirred solution of 69 grams sodium dihydrogen phosphate mono hydrate dissolved in 500 ml water. The product was filtered, washed, and air-dried. Initial molar concentration of phosphate was 1.0 and final mesh was 16 – 200.

EXAMPLE IV 10 grams zirconyl nitrate (glass) screened 14 mesh and above were slowly added to a stirred solution of 20 cc concentrated phosphoric acid in 180 cc of water. The product was filtered, washed, and air-dried. Initial molar concentration was 1.4 and final mesh was 12 or greater.

EXAMPLE V 17 grams zirconium oxychloride screened 28–48 mesh was slowly added to a stirred solution of 35 ml concentrated phosphoric acid dissolved in 965 ml of water. The granular product was filtered, washed and air-dried. Initial molar concentration of phosphate was 0.5 and final mesh was 10 – 325.

The final molar concentration of phosphate was less than 0.5 molar and the product was unsatisfactory for column use because the large particles easily broke into dust, giving particles of smaller mesh than 325.

EXAMPLE VI 120 grams zirconium oxychloride screened 28–48 mesh was slowly added to a stirred solution of 100 ml concentrated phosphoric acid dissolved in 900 ml of water. The granular product was filtered, washed, and air-dried. Initial phosphate molar concentration was 1.4 and final mesh was 12 – 80. The final molar concentration of phosphate was 0.5.

EXAMPLE VII 49.5 grams zirconium oxychloride screened 28–48 mesh was slowly added to a stirred solution of 170 ml concentrated phosphoric acid dissolved in 830 ml of water. The granular product was filtered, washed and air-dried. Initial molar concentration of phosphate was 2.5 and final mesh was 28 – 60.

EXAMPLE VIII 32 pounds zirconium oxychloride screened 14 mesh and above was slowly added to a stirred solution of 3.2 gallons 75 percent phosphoric acid dissolved in 24 gallons of water. The finished product was filtered, washed and air-dried. The initial molar concentration of phosphate was 1.5 and final mesh was 12 and above.

In the above examples, the molar concentration at all times exceeded 0.5 except for Example V where unsatisfactory product was produced. In the case of Example VII, the initial molar concentration of phosphate was 2.5 which was found to be the approximate upper limit for this particular phosphate compound. Example VIII is typical of a commercial production run wherein approximately 40 pounds of product was produced.

In the production of hydrous zirconium oxide, the process is basically the addition of granular zirconium compound to a basic solution, and the resulting particle size is similar to the original granular size of the zirconium compound. A soluble zirconium compound in granular form is added to a stirred basic solution, such as sodium hydroxide solution, and this produces granules of hydrous zirconium oxide. The soluble anion is replaced by the insoluble hydroxide of zirconium which is the hydrous oxide as described by the following equation:

where: $X = Cl^-, NO_3^-, 1/2\ SO_4, CH_3CO_2^-$

In one particular example, a soluble zirconium compound, such as zirconium oxychloride, is added in particle form to a solution of sodium hydroxide to produce granules of hydrated (hydrous) zirconium oxide in accordance with the following reaction:

Where X is from 0 to 8 and Y is indeterminate

The molar concentration of the basic solution is not critical since a molar concentration of NaOH can be at the lower limit of $10^{-5}$. The zirconium compounds include zirconium oxychloride, zirconium nitrate, zirconium sulfate, zirconium acetate and basic zirconium sulfate. The basic solution acts as an insolubilizing reagent since it changes the zirconium into insoluble hydrated (hydrous) zirconium oxide and thereby fixes the shape of the granules. Typical examples of the preparation of hydrous zirconium oxide are as follows:

EXAMPLE IX 50 grams zirconium oxychloride 28–60 mesh were slowly added to 17 grams sodium hydroxide dissolved in 250 cc water. Stirring was allowed to continue for 15 minutes. The product was filtered, washed, and air-dried. Initial molar concentration of hydroxide was 1.7 and final mesh was 20 – 80.

EXAMPLE X 50 grams zirconium oxychloride 28–60 mesh were slowly added to a stirred solution of 30 cc 28 percent ammonium hydroxide in 220 cc water. Stirring was allowed to continue for 15 minutes. The product was filtered, washed, and air-dried. Initial molar concentration of hydroxide was 2.0 and final mesh was 20 – 80.

EXAMPLE XI 50 grams zirconium nitrate 60 mesh and above were added to a stirred solution of 8 grams sodium hydroxide dissolved in 250 cc water. The mixture was allowed to stir for 10 minutes. The product was filtered, washed, and air-dried. Initial molar concentration of hydroxide was 0.8 and final mesh was 48 and above.

EXAMPLE XII 50 grams zirconium oxychloride 28–60 mesh were slowly added to 16 grams sodium hydroxide dissolved in 250 cc water. Stirring was allowed to continue for 10 minutes. The product was allowed to settle. Fines were decanted off. The granular product was filtered, washed, and air-dried. Initial molar concentration of hydroxide was 1.6 and final mesh was 20 – 80.

From the above description, it is apparent that the insolubilizing reagent, such as the phosphate solution or the basic solution, can fix the zirconium in insoluble form in substantially the particle configuration found when the reagent contacts it. Thus, the granular size is within substantially the same range as the initial granular size and this permits the mesh distribution band of the final product to be determined by the initial mesh band. Also, the final product can be commercially produced in a band of particle size which is acceptable in a typical ion exchange column. In the case of zirconium phosphate, being insoluble, fixes the zirconium and in the case of the basic solution, the resulting product is an insoluble hydrous oxide. The zirconium phosphate in suitable size range can also be utilized in water softeners, industrial water treatment and removal of heavy metals from nuclear waste solutions. The fine particles can be used in slurries to remove ammonia and metal ions from solutions in sewage treatment plants. The hydrous zirconium oxide can also be utilized for removal of phosphates from waste water and for removal of fluorides from water, and the fine particles can be used in ointments, skin creams, and anti-perspirants.

What is claimed as new in support of Letters Patent is:

1. A process for producing a granular zirconium hydrous oxide ion exchanger of a predetermined particle size distribution comprising the steps of:

selecting an aqueous solution of a reagent wherein the reagent is selected from the group consisting of the water soluble phosphates and the bases which provide a hydroxyl ion in aqueous solution;

reacting the reagent with a granular zirconium compound to form a granular zirconium hydrous oxide ion exchanger product, in the reagent solution, of a particle size distribution determined by that of the granular zirconium compound, said reaction being accomplished by adding to the reagent solution, in granular form, a granular zirconium compound which is more soluble in the aqueous reagent than said granular ion exchanger product formed therein and allowing the zirconium compound to react with the reagent for at least a sufficient time to substantially convert the zirconium compound to said granular ion exchanger product in the reagent solution; and recovering said ion exchanger product.

2. The process of claim 1 wherein during the reacting step the temperature of the aqueous reagent solution is from about room temperature to about 100°C and the granular zirconium compound is added with stirring which continues from about 5 to about 30 minutes.

3. The process of claim 1 wherein the granular zirconium compound has a particle size distribution band which corresponds generally to an ion exchanger particle size distribution band usable in an ion exchanger column.

4. The process of claim 3 wherein the particle size distribution band of the granular zirconium compound is from about 12 to about 325 mesh.

5. The process of claim 1 wherein the granular zirconium compound is selected from the group consisting of zirconium oxychloride, zirconium nitrate, zirconium sulfate, zirconium acetate, and basic zirconium sulfate.

6. The process of claim 1 wherein the reagent is a water soluble phosphate and the insoluble zirconium hydrous oxide ion exchanger product is a zirconium phosphate.

7. The process of claim 6 wherein the concentration of the phosphate in the aqueous reagent solution remains above about 0.5 molar during the reaction step of the process.

8. The process of claim 6 wherein the water soluble phosphate is selected from the group consisting of phosphoric acid, sodium phosphate, and a mixed sodium hydrogen phosphate solution.

9. The process of claim 5 wherein the reagent is a water soluble phosphate and the insoluble zirconium hydrous oxide ion exchanger is an insoluble zirconium phosphate.

10. The process of claim 1 wherein the reagent is a base which provides a hydroxyl ion in aqueous solution and the insoluble zirconium hydrous oxide ion exchanger product is an insoluble hydrous zirconium oxide.

11. The process of claim 10 wherein the base is selected from the group consisting of sodium hydroxide and ammonium hydroxide.

12. The process of claim 5 wherein the reagent is a base which provides a hydroxyl ion in aqueous solution and the product is an insoluble hydrous zirconium oxide.

13. The process of claim 1 wherein the recovery step includes the step of drying the product.

* * * * *

UNITED STATES PATENT OFFICE
CERTIFICATE OF CORRECTION

PATENT NO. : 3,850,835
DATED : November 26, 1974
INVENTOR(S) : LAURENCE B. MARANTZ and CLIFFORD M. MORAN It is certified that error appears in the above-identified patent and that said Letters Patent are hereby corrected as shown below:

In column 1, line 32, cancel "results in a very fine powder" and insert therefore -- is comprised of large, hard particles -- . In column 2, line 11, after "1969," insert -- now U.S. Patent No. 3,669,880, -- . In column 4, line 20, "followikng" should read -- following --; and in line 22, after "$H_3PO_4$" there should be inserted -- → -- . In column 5, line 60 "$OH^+$" should read -- $OH^-$ -- which should be followed by -- → -- ; and in line 61 "1/2 $SO_4$" should read -- 1/2 $SO_4^=$ -- . In column 6, line 1, that portion of the formula reading "$Cl_2$ X" should read -- $Cl_2 \cdot X$ --; and "2NaOH" should be followed by -- → --; and in line 60, after "phosphate," insert -- the phosphate, -- .

Signed and Sealed this fourth Day of November 1975

[SEAL]

Attest:

RUTH C. MASON
*Attesting Officer*

C. MARSHALL DANN
*Commissioner of Patents and Trademarks*